United States Patent [19]

Murayama et al.

[11] Patent Number: 4,467,365
[45] Date of Patent: Aug. 21, 1984

[54] CONTROL SYSTEM FOR READING DEVICE

[75] Inventors: Tomio Murayama; Fujio Moriguchi; Masami Kurata; Takashi Omori, all of Kanagawa, Japan

[73] Assignee: Fuji Xerox Co., Ltd., Kanagawa, Japan

[21] Appl. No.: 311,357

[22] Filed: Oct. 14, 1981

[30] Foreign Application Priority Data

Oct. 16, 1980 [JP] Japan .................................. 55-143651

[51] Int. Cl.³ ............................................. H04N 1/10
[52] U.S. Cl. ........................................................ 358/293
[58] Field of Search ................ 358/293, 212, 264, 213

[56] References Cited

U.S. PATENT DOCUMENTS 4,146,786 3/1979 Agulmek .............................. 358/213
4,249,217 2/1981 Korte ................... 358/213
4,356,513 10/1982 Yoshimura ........................... 358/213

Primary Examiner—John C. Martin
Assistant Examiner—Edward L. Coles
Attorney, Agent, or Firm—Sughrue, Mion, Zinn, Macpeak, and Seas

[57] ABSTRACT

A plurality of image sensors cover overlapping regions and provide output signals which are selected during nonoverlapping times and combined into a synthetic video signal. The timing of all sensor selections except the first are keyed to the first so that adjustment of the first starting time can move the entire scanning interval.

10 Claims, 4 Drawing Figures

CONTROL SYSTEM FOR READING DEVICE

BACKGROUND OF THE INVENTION

This invention concerns a system for controlling the reading timing in a number of solid state image sensors in an optical reading device in which the surfaces of an original object, e.g., a document, is divided into a plurality of regions and different solid state image sensors are allocated to each of the respective regions to thereby read picture images. In a typical device, the image sensor is of the scanning type made up of a plurality of sensing elements which are sequentially energized to each provide an image signal corresponding to a respective portion of the overall image. If a plurality of a solid state image sensors are used, each of which is made up of a plurality of individual sensing elements which must be scanned, there are some possible advantages in terms of image quality, but problems are encountered in making sure that the regions covered by each of the image sensors are continuous at the boundaries and that a proper timing sequence is maintained for the scanning operations.

More particularly, reading devices adapted to conduct successive line reading using a plurality of solid state image sensors (hereinafter referred to simply as sensors) are advantageous over reading devices using only one sensor, since the optical distance between the sensor and original can be shortened and optical distortion is decreased, but multiple sensor devices are disadvantageous in that they are more difficult to fabricate. More specifically, two types of adjusting procedures have been required in the fabrication of conventional reading devices, (1) an adjustment to ensure that the video signals outputted from each of the sensors is continuous at the boundary between each of the regions, and (2) an adjustment to insure that the image regions to be read by each of the sensors coincides with the corresponding region of the original to be read. Such adjustments, either mechanical or electrical, have been very difficult to accomplish satisfactorily since the adjusting procedure for one of them may impair the result of the adjusting procedure for the other.

SUMMARY OF THE INVENTION

In view of the foregoing, it is an object of this invention to provide a control system for a reading device capable of simplifying the adjustments.

Briefly, the foregoing can be attained according to this invention by overlapping the regions to be read by each of the sensors with each other in the main scanning direction, providing timing means for setting a time during which an output signal will be taken from a first sensor, and then setting the time for taking output signals from other sensors using the first sensor timing as a reference, so that the timing adjustment can be completed by merely adjusting the first sensor timing.

BRIEF DESCRIPTION OF THE DRAWINGS

This invention will be described in more detail with reference to the accompanying drawings, in which.

DETAILED DESCRIPTION OF THE PREFERRED EMBODIMENTS

Figure 1:
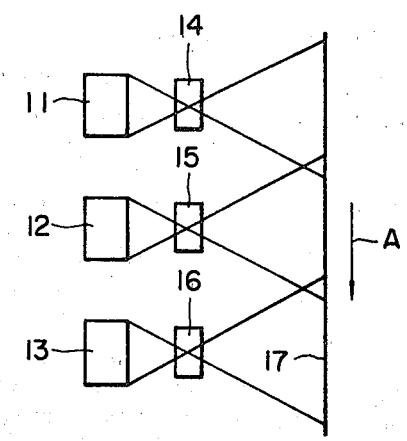
FIG. 1 is an illustration of the arrangement of an optical system.

FIG. 1 shows the arrangement of the optical system in an embodiment of this invention. In this embodiment, three sensors 11-13 are disposed in the main scanning direction A at predetermined intervals. Image information on the reading surface 17 is divided for reading into three regions by lenses 14-16 provided respectively for each of the sensors 11-13. The areas on the reading surface to be read by the three sensors 11-13 overlap one another to some extent in the main scanning direction. Further, the focal length, etc., of the lenses are chosen so that the entire range covered by these sensors in the plane of the original 17 is slightly wider than the area of the original desired to be read. So long as the foregoing conditions are satisfied, it is unnecessary for the three sensors 11-13 and their respective lenses 14-16 to be accurately disposed at precise positions. Finer adjusting procedures are conducted hereinafter in an electrical manner to be described later.

Figure 2:
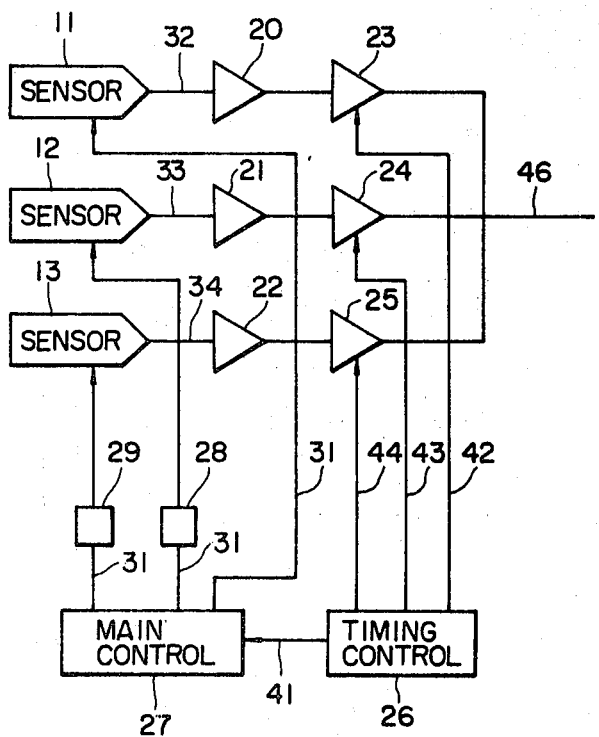
FIG. 2 is a block diagram showing an electric circuit for the reading device.

FIG. 2 shows an electrical control circuit which forms a part of the reading device. The reading device circuit comprises video amplifiers 20-22 for amplifying video signals outputted from each of the sensors 11-13, analog gates 23-25 for selectively outputting the video signals from the video amplifiers 20-22 as synthetic video signals, a timing controller 26 which instructs the closure and opening of these analog gates, and a main control circuit 27 for directly controlling the scanning period of the first sensor 11 and controlling the scanning periods of other sensors 12, 13 through sub-scanning circuits 28, 29 which may be simple delay circuits.

Figure 3:
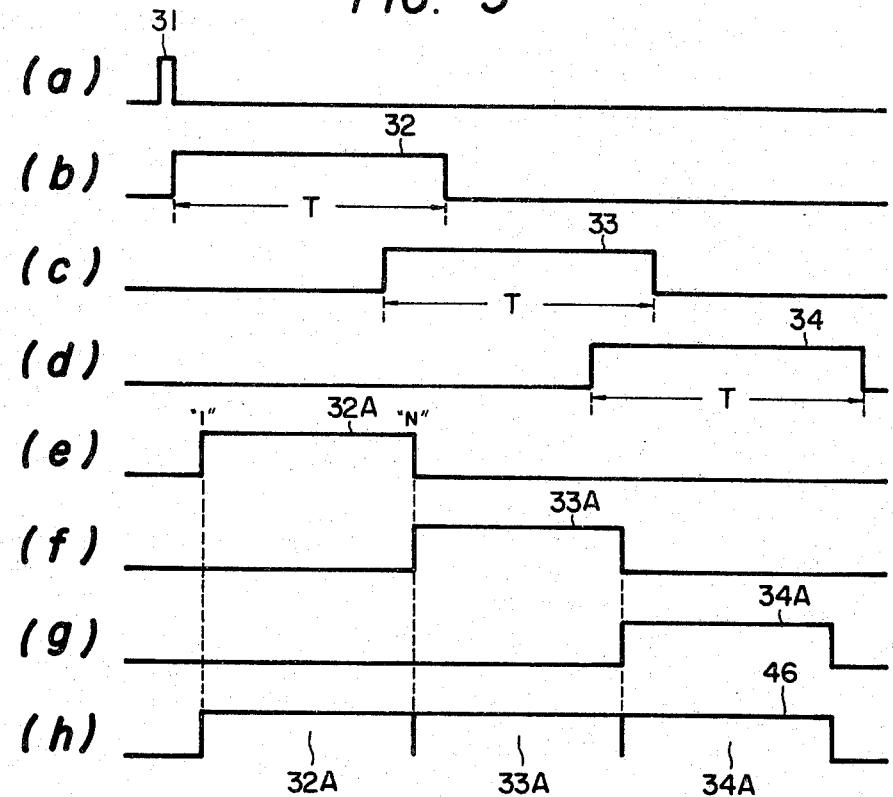
FIG. 3 is a waveform chart for the explanation of operation in each section of the electrical circuit.

When power supply is fed to the reading device, pulse-like reference signals 31 are generated from the main control circuit 27 prior to the scanning for each scanning line as shown in FIG. 3(a). The reference signals 31 are applied to the first sensor 11 and video signals are outputted from the first sensor over a predetermined period T starting from the falling of the reference signals 31 (FIG. 3b). The video signals 32 are supplied to the first video amplifier 20, amplified to a predetermined level and then applied to the first analog gate 23.

The reference signals 31 are also supplied to the first and second sub-control circuits 28, 29. The first subcontrol circuit 28 delays the signal 31 for a predetermined time and applied it to sensor 12, thus causing video signals 33 to be outputted from the second sensor 12 over substantially the same predetermined duration T referred to above but beginning some time later. Although delayed, the output signal 33 begins before the end of the output of the video signals 32 from the first sensor 11 (FIG. 3c). The second sub-control circuit 29 further delays the signal 31 and causes the video signals 34 to be outputted from the third sensor 13 over substantially the same predetermined duration T beginning sometime before the end of the output of the video signals 33 from the second sensor 12 (FIG. 3d). The video signals 33, 34 are supplied to respective second and third amplifiers 21, 22 amplified to a predetermined level and then applied to the corresponding first and second analog gates 24, 25.

Figure 4:
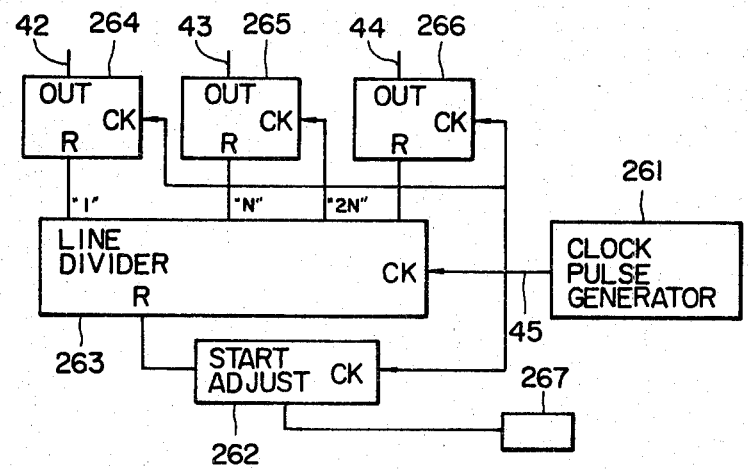
FIG. 4 is a block diagram showing the details of gate signal preparing section in the timing controller.

At the start of the scanning for each of the scanning lines the timing controller 26 applies a reference timing signal 41 to the main control circuit 27 which then provides the pulse 31, and circuit 16 also applies gate signals 42–44 for selectively opening and closing the first through third analog gates 13–25. FIG. 4 is a block diagram showing in the details of the gate signal preparing section in the timing controller 26. Clock pulses 45 outputted from a clock pulse generator 261 are supplied to a start position adjusting counter 262, a scanning line dividing counter 263 and three scanning width setting counters 264–266 respectively.

The starting position adjusting counter 262 is a counter which controls the time delay between the occurrence of a reference pulse 31 and the time at which the gate 23 is activated to provide the output of sensor 11 as the synthetic video signals 46 (FIG. 2). Specifically, the start position adjusting counter 262 counts the number of clock pulses outputted from the clock pulse generator 262 from the time each main scanning is started. The start position adjusting counter 262 continually supplies reset signals to the reset terminal R of the scanning line dividing counter 263, thereby inhibiting its counting operation, until the counted value in counter 262 arrives at a predetermined preset value set by the manipulation of a switch (not shown) provided in the present signal source 267.

When the counted value in the start position adjusting counter 262 arrives at the predetermined preset value, the output from counter 262 stops and the scanning line dividing counter 263 starts up its counting. Shortly thereafter, when the counted value arrived at "1", the reset input which has been continuously applied to the reset terminal R of the first scanning width setting counter 264 is discontinued. The first scanning width setting counter 264 starts counting the clock pulses 45 as soon as the reset input is discontinued and issues a gate signal 42 from the output terminal OUT until N clock pulses have been counted. During this time, the first analog gate 23 outputs the video signals 32A (FIG. 3e) as synthetic video signals 46 (FIG. 3h). The scanning line dividing counter 263 further includes an output terminal that provides a reset signal to the reset terminal R of the second scanning width setting counter 265 till the value accumulated in counter 263 arrives at "N", and another output terminal that provides a reset signal to the reset terminal R of the third scanning width setting counter 266 until the value accumulated in counter 263 arrives at "2N". The second and the third scanning width setting counters 265, 266 are the same as counter 264 in that gate signals 43 are provided from the output terminal OUT of the second scanning width setting counter 265 and gate signals 44 are provided from the output terminal OUT of the third scanning width setting counter 266 until N pulses are counted. Accordingly, at the same time that the video signals 32A from the first analog gate 23 are discontinued, analog gate 24, begins providing the video signals 33A (FIG. 3f) at its output. Further at the same time that the video signals 33A from the second analog gate 24 are discontinued, the output of the video signals 34A (FIG. 3g) from the third analog gate begins. Since some of the document portions covered by the end of each scan are eliminated and some covered at the beginning of each scan are eliminated, the image portions provided by the solid image sensors are continous but non-overlapping. As a result, synthetic video signals 46 which are continuous over each scanning line are generated as the sum of each of the video signals 32A–34A. Accordingly, synthetic video signals 46 which correspond to the surface of the original and whose images are continuous can be obtained by selecting the frequency of counter 261 such that 3N clock pulses corresponds to the scanning period of the main scanning width for the original. It is then a simple matter to adjust the preset signal source 267 so that the timing of the first gate 23 is appropriate, and the timing of the remaining gates will be automatically shifted appropriately.

As can be seen from the above description, according to this invention, highly accurate and reliable adjustment is enabled since the adjustment for the starting position of the reading by the first sensor and the adjustment for the continuity between the video signals in a plurality of sensors can be conducted in a digital mode. Further, the setting for the entire reading area and the adjustment for continuity between reading areas of each of the sensors can be carried out in a separate manner.

Although analog gates are employed in this embodiment for selecting the signals outputted from a plurality of sensors, it will be apparent that the timing for the video signals outputted from each of the sensors may instead be directly controlled by those circuits corresponding to the main control circuit and the sub-control circuits in the above embodiment.

What is claimed is:

1. In a reading device of the type having a plurality of scanning type image sensors for covering a plurality of regions of an image to be read, said image sensors being disposed adjacent one another in a scanning direction and, in response to respective scanning signals, sequentially providing respective image sensor output signals which are combined into a synthetic video signal representing the read image, a control circuit comprising:
    means for providing scanning signals to said plurality of image sensors during individual time intervals which collectively span a continuous time interval;
    start position control means for determining a start time at which the output signal of a first of said plurality of sensors is to be provided as a part of said synthetic video signal;
    set position control means for determining, in accordance with said first start time, remaining start times at which outputs from the remainder of said plurality of sensors are provided as part of said synthetic video signal; and
    signal selection means for selecting outputs from said image sensors in accordance with the times determined by said start position and set position control means.

2. A control circuit as claimed in claim 1, wherein said signal selection means comprises a plurality of control counters each providing a selection signal for a predetermined time duration beginning with one of said first or remaining times, the time duration of the selection signal from each control counter being selected to be substantially equal to the time interval between the start time of said each control counter and the start time of the next control counter, whereby the output signals from said plurality of image sensors inserted into said synthetic video signal are continuous but non-overlapping.

3. A control circuit as claimed in claim 1 or 2, wherein said start position control means comprises a source of clock pulses and a start position counter for counting said clock pulses and providing an output when a predetermined count has been reached.

4. A control circuit as claimed in claim 3 wherein said start position control means further comprises adjustment means for adjusting said predetermined count at which an output signal is provided from said start position counter, whereby all of said first and remaining start positions, and accordingly the entire continuous scanning interval, can be adjusted by said adjustment means.

5. A control circuit as claimed in claim 3, wherein said set position control means comprises a set position counter for receiving and counting said clock pulses when enabled by said output from said start position counter, said set position counter providing a plurality of outputs at different count values, said plurality of outputs indicating said start times.

6. A control circuit as claimed in claim 4, wherein said set position control means comprises a set position counter for receiving and counting said clock pulses when enabled by said output from said start position counter, said set position counter providing a plurality of outputs at different count values, said plurality of outputs indicating said start times.

7. A control circuit as claimed in claim 5, wherein said plurality of regions are overlapping, said individual time intervals are overlapping, and said signal selection means comprises a plurality of gate means each provided at the output of one of said sensors and each gate being enabled in accordance with said start times determined by said start and set position control means.

8. A control circuit as claimed in claim 6, wherein said plurality of regions are overlapping, said individual time intervals are overlapping, and said signal selection means comprises a plurality of gate means each provided at the output of one of said sensors and each gate being enabled in accordance with said start times determined by said start and set position control means.

9. A control circuit as claimed in claim 2, wherein said plurality of regions are overlapping, said individual time intervals are overlapping, and said signal selection means comprises a plurality of gate means each provided at the output of one of said sensors and each gate being enabled by a respective one of said selection signals.

10. A control circuit as claimed in claim 1, wherein said individual time intervals are overlapping.

* * * * *